United States Patent Office 2,744,896
Patented May 8, 1956

2,744,896

N,N'-ALKYLENEBISBENZOSULFOTRIAZENES

Frank A. V. Sullivan, Glenbrook, Conn., assignor to American Cyanamid Company, New York, N. Y., a corporation of Maine No Drawing. Application December 14, 1954, Serial No. 475,269

4 Claims. (Cl. 260—243)

This invention relates to a new class of compounds. Particularly it relates to sulfotriazines, especially N,N'-alkylenebisbenzosulfotriazines of the formula

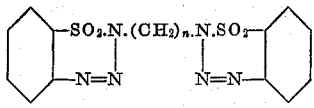

While $n$ may vary widely, it has been found that the compounds having from 1 to 4 carbon atoms are particularly well suited for certain uses, and these, accordingly, form a preferred embodiment of this invention.

The new compounds in accordance with this invention are useful in the fields of pharmaceuticals, dyes, rubber processing and the like. Specifically, it has been found that these compounds are particularly useful as blowing agents in the preparation of cellular rubber and plastic materials.

The N,N'-alkylenebisbenzosulfotriazines of this invention may be prepared by diazotizing an alkylenebis(2-aminobenzenesulfonamide) in the usual manner. Upon completion of the diazotization reaction, the product may be isolated by making the solution alkaline with sodium carbonate, filtering off the precipitated product, washing with water and drying.

The compounds of this invention are further illustrated by the following examples which are not intended to be limiting. All parts are by weight unless otherwise noted.

EXAMPLE 1

*N,N'-ethylenebisbenzosulfotriazine*

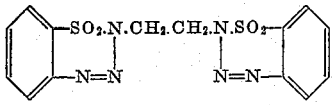

24 parts of N,N'-ethylenebis(2-aminobenzenesulfonamide hydrochloride) is suspended in 150 parts of 6 N H₂SO₄ and the suspension chilled to 3° C. A solution of 8.4 parts of NaNO₂ in 50 parts of H₂O is then dripped into the chilled suspension. As diazotization proceeds the suspension thins and at its completion a small amount of insoluble material is filtered off. The filtrate is then made alkaline with Na₂CO₃ and a solid product precipitates. After separation by filtration and washing, the crude material is recrystallized from dioxane to give a yellow crystalline product, M. P. 150–152° C. with decomposition.

EXAMPLE 2

*N,N'-trimethylenebisbenzosulfotriazine*

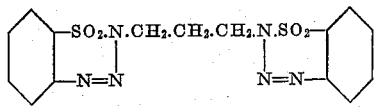

22.85 parts of N,N'-trimethylenebis(2-aminobenzenesulfonamide hydrochloride) is suspended in 150 parts of 6 N H₂SO₄ containing a drop of Ultrawet 30 DS. The reaction mixture is chilled to 3° C., an aqueous solution containing 8.4 parts of NaNO₂ added dropwise at 3–5° C. and the mixture stirred for 0.5 hr. at 0–5° C. An aqueous Na₂CO₃ solution is then added until the mixture is alkaline. The precipitated product is filtered off, washed and dried. On recrystallization from dioxane the product melts at 140–142° C. with decomposition.

EXAMPLE 3

*N,N'-tetramethylenebisbenzosulfotriazine*

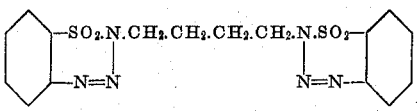

23.5 parts of N,N'-tetramethylenebis(2-aminobenzenesulfonamide hydrochloride) is suspended in 150 parts of 6 N H₂SO₄ and the mixture chilled to 3° C. An aqueous solution containing 8.4 parts of NaNO₂ is then added dropwise at 3–5° C. and the mixture stirred at 0.5° C. for one-half hour. An aqueous Na₂CO₃ solution is then added until the mixture is alkaline. The precipitated product is filtered off, washed and dried. The product is then recrystallized from dioxane, M. P., 128–130° C. with decomposition.

To illustrate the use of the compounds of this invention as blowing agents in the preparation of cellular rubber, the following Example 4 was run. In this example samples of each rubber stock are blown at 153° C. for 35 minutes and 130° C. for 60 minutes. The mold load is 6 cubic inches and both high and low loads are blown at each temperature for each stock. In the case of white stock, the respective portions for high and low loads are 51 grams and 42 grams while for neutral colored stock they are 48.5 grams and 40 grams.

In order to simplify the example, the following abbreviations are employed:

Compounds—
    MBTS, bisbenzothiazoledisulfide
    DOTG, di-o-tolylguanidine
Degree of blow—
    C, complete
    SRC, nearly complete, corners slightly rounded
    RC, corners rounded
Cell structure—
    F, fine

EXAMPLE 4

Two rubber stocks, one containing p,p'oxybis(benzenesulfonylhydrazide), one of the more successful of the commercially available blowing agents, and the other N,N'-ethylenebisbenzosulfotriazine, a compound according to the present invention, are compounded according to the following composition:

| Compound: | Parts |
|---|---|
| Plasticized smoked sheet | 100 |
| 2,2'-methylene-bis(4-methyl-6-t-butylphenol) | 0.5 |
| Stearic acid | 2 |
| Sulfur | 3 |
| Petrolatum | 3 |
| Keystone Whiting | 50 |
| Light process oil | 10 |
| Zinc oxide | 5 |
| MBTS | 0.6 |
| DOTG | 0.15 |
| Blowing agent | 1.5 |

Samples of each stock are blown as described above. Results are recorded in Table I.

Table I

| Blowing Agent | Blown at 130° C. for 60 min. | | | | Blown at 153° C. for 35 min. | | | |
|---|---|---|---|---|---|---|---|---|
| | Low Load (40 g.) | | High Load (48.5 g.) | | Low Load (40 g.) | | High Load (48.5 g.) | |
| | Blow | Cells | Blow | Cells | Blow | Cells | Blow | Cells |
| p,p'-oxybis(benzenesulfonylhydrazide) | RC | F | C | F | SRC | F | C | F |
| N,N'-ethylenebisbenzosulfotriazine | C | F | C | F | SRC | F | C | F |

I claim:
1. A compound of the formula

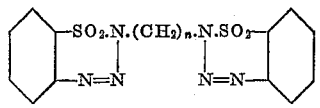

in which $n$ is an integer 1 to 4.
2. N,N'-ethylenebisbenzosulfotriazine.
3. N,N'-trimethylenebisbenzosulfotriazine.
4. N,N'-tetramethylenebisbenzosulfotriazine.

References Cited in the file of this patent
UNITED STATES PATENTS
2,402,611     Dickey et al. _ _ _ _ _ _ _ _ _ _ _ _ June 25, 1946